C. J. McCARTHY.
FISHING LURE.
APPLICATION FILED DEC. 7, 1917.
1,257,008. Patented Feb. 19, 1918.
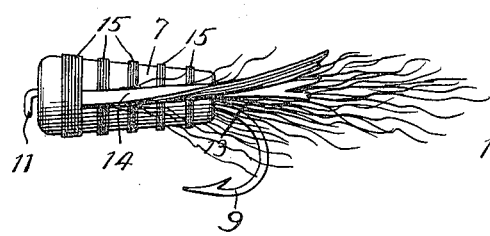
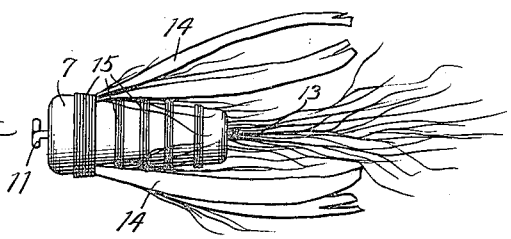
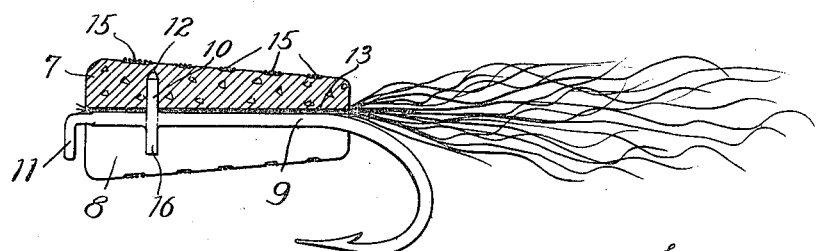
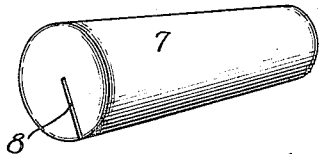
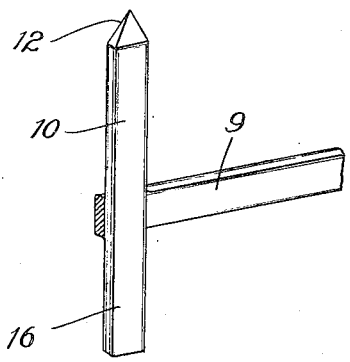
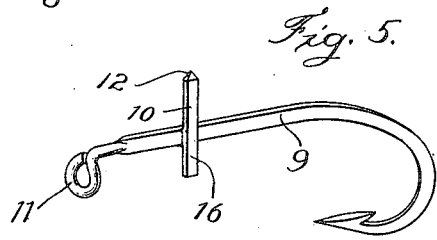

UNITED STATES PATENT OFFICE.

CALL J. McCARTHY, OF CHICAGO, ILLINOIS.

FISHING-LURE.

1,257,008.

Specification of Letters Patent.

Patented Feb. 19, 1918.

Application filed December 7, 1917. Serial No. 206,056.

*To all whom it may concern:*

Be it known that I, CALL J. McCARTHY, a citizen of the United States, residing at Chicago, in the county of Cook and State of Illinois, have invented a new and useful Improvement in Fishing-Lures, of which the following is a specification.

My invention relates more particularly, though not exclusively, to artificial casting flies, or the like, formed of a hook-equipped body portion preferably of cork, or other buoyant material, and of a form to simulate the body of a bug or fly, and feathers and hair arranged to simulate the wings and tail of a bug or fly; and my object, generally stated, is to provide a novel and economical construction of fishing lure which will withstand the stresses to which it is subjected in use, particularly in the removal of the hook from the mouth of the fish.

Referring to the accompanying drawing, Figure 1 is a view in side elevation of fishing lure constructed in accordance with my invention. Fig. 2 is a plan view of the same. Fig. 3 is an enlarged view in vertical, sectional elevation of the device shown in the preceding figures. Fig. 4 is a perspective view of the body portion of the lure. Fig. 5 is a perspective view of the hook portion of the lure; and Fig. 6 an enlarged, broken view of the shank of the hook showing the portion with which it is provided for preventing the turning and lengthwise movement of the hook and body relative to each other.

The body of the lure is illustrated at 7, this body in accordance with the preferred embodiment of my invention being formed of buoyant material such as cork, or where molded, of cork composition. Preferably when the body is formed from a piece of cork, it is cut through one side, as by a saw, to form a kerf 8, or if desired slit by a knife, or if molded, either sawed or cut, or molded with a slit, the slit portion extending lengthwise of the body and preferably to about its longitudinal center, as illustrated. The hook is represented at 9 and has a portion 10 which extends laterally therefrom at a point on the hook shank between the eye 11 of the hook and the opposite end thereof. The portion 10 is preferably formed of a flat piece of relatively stiff metal wire applied to one side of the hook shank and brazed or otherwise fastened thereto, to extend at an angle therefrom, preferably at a right angle. The end of the portion 10 is preferably pointed, as indicated at 12 for a purpose hereinafter explained, though this is not necessary so long as the projection is of such form at its end that it can be forced into embedded condition in the body 7, with comparative ease, as hereinafter described.

In the construction of the lure as shown, the hook is inserted at its shank portion into the slit 8 through the side of the body 7, the portion 10 which forms a prong, becoming embedded in the unslit portion of the body as shown in Fig. 3, the strands of hair represented at 13, when provided, being preliminarily inserted into the slit 8 before the hook is applied to place therein. Any suitable water-proofing glue is then preferably introduced into the slit 8 and the body 7 with the feather sections 14 applied thereto to resemble wings, wound at intervals with thread or wire represented at 15 to firmly draw together the slit portions of the body and bind the hook and feathers in place.

The prong 10 on the hook by being embedded in the solid portion of the body which is thus compressed about the prong, by reason of forcing the prong into the body, serves not only to firmly hold the hook and body against relative movement lengthwise of the device, but also prevents relative rotation of these parts under the stresses to which it is subjected in use, particularly when removing the hook from the mouth of the fish; and this feature of the construction is also of value in the manufacture of the device, as the embedment of the prong in the solid portion of the body prevents the slipping and lateral displacement of the hook on the body during the winding of the body as stated, thus insuring the proper relative positioning of these parts in the finished device.

The hook shown is also provided with a laterally projecting portion 16 at the side thereof opposite that carrying the prong 10, for further aiding, if desired, in the maintaining of the hook in the body in the desired position, this projection in the construction shown being formed integrally with the prong 10 by securing the wire to the hook shank between the ends of the wire, as shown.

While I have illustrated and described a particular construction in which my invention is embodied, I do not wish to be understood as intending to limit it thereto, as the same may be variously modified and altered without departing from the spirit of my invention, it being my intention to claim my invention as fully and completely as the prior state of the art will permit.

What I claim as new and desire to secure by Letters Patent is—

1. A fishing lure formed of a body and a hook thereon having a lateral projection between its eye-portion and the opposite end of the hook extending into said body and so constructed that in the act of applying the hook to position on said body at its side to extend lengthwise therein, said projection becomes embedded in the solid portion of said body and prevents turning and lengthwise movement of said body and hook relative to each other.

2. A fishing lure formed of a body containing a slit along one side, and a hook lying within said slit and provided with a laterally extending projection which is embedded in said body beyond its slit portion by the act of inserting the hook to place in said body through the side of the latter.

3. A fishing lure formed of a body containing a slit along one side, and a hook lying within said slit and provided with a laterally extending projection which is embedded in said body beyond its slit portion by the act of inserting the hook to place in said body through the side of the latter, and with a second projection extending in a direction opposite to that in which said first-named projection extends and lying between the walls of the slit.

CALL J. McCARTHY.